(12) United States Patent
Seo et al.

(10) Patent No.: US 8,644,209 B2
(45) Date of Patent: Feb. 4, 2014

(54) METHOD OF RELAYING DATA

(75) Inventors: Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 229 days.

(21) Appl. No.: 13/130,295

(22) PCT Filed: Dec. 1, 2009

(86) PCT No.: PCT/KR2009/007111
§ 371 (c)(1),
(2), (4) Date: May 19, 2011

(87) PCT Pub. No.: WO2010/064828
PCT Pub. Date: Jun. 10, 2010

(65) Prior Publication Data
US 2011/0223927 A1 Sep. 15, 2011

Related U.S. Application Data

(60) Provisional application No. 61/119,381, filed on Dec. 3, 2008.

(30) Foreign Application Priority Data

Mar. 25, 2009 (KR) ........................ 10-2009-0025568

(51) Int. Cl.
*H04B 7/14* (2006.01)
*H04W 4/00* (2009.01)
*H04W 72/00* (2009.01)

(52) U.S. Cl.
USPC ............... 370/315; 370/328; 370/329; 455/7; 455/450

(58) Field of Classification Search
USPC ......... 370/274–277, 279, 280, 310, 315, 328, 370/329; 455/7, 450, 451
See application file for complete search history.

(56) References Cited

U.S. PATENT DOCUMENTS

| | | |
|---|---|---|
| 2007/0060050 A1 | 3/2007 | Lee et al. |
| 2008/0070582 A1 | 3/2008 | Cai |
| 2008/0205323 A1 | 8/2008 | Kaneko et al. |
| 2008/0259857 A1* | 10/2008 | Zheng .......................... 370/329 |
| 2008/0285500 A1* | 11/2008 | Zhang et al. ................. 370/315 |
| 2009/0010198 A1* | 1/2009 | Boariu et al. ................ 370/315 |
| 2011/0096715 A1* | 4/2011 | Park et al. .................... 370/315 |

FOREIGN PATENT DOCUMENTS

WO     2007/129620 A1     11/2007

* cited by examiner

*Primary Examiner* — Hassan Phillips
*Assistant Examiner* — Saba Tsegaye
(74) *Attorney, Agent, or Firm* — Lee, Hong, Degerman, Kang & Waimey (57) ABSTRACT

A method of relaying data in a relay station of a wireless communication system based on a radio frame consisting of a plurality of downlink subframes and a plurality of uplink subframes is provided. The method includes receiving, from a base station, a scheduling message at a downlink subframe and transmitting, to the base station, uplink data at a first uplink subframe or a second uplink subframe according to the scheduling message, wherein the first uplink subframe is an uplink subframe shifted by 4 subframes from the downlink subframe, and wherein when the scheduling message includes a scheduling field which indicates decreasing or increasing a time interval between a time of receiving the scheduling message and a time of transmitting the uplink data, the uplink data is transmitted at a second uplink subframe indicated by the scheduling field.

8 Claims, 9 Drawing Sheets

METHOD OF RELAYING DATA

CROSS-REFERENCE TO RELATED APPLICATIONS

This application is the National Stage filing under 35 U.S.C. 371 of International Application No. PCT/KR2009/007111, filed on Dec. 1, 2009, which claims the benefit of earlier filing date and right of priority to Korean Patent Application No. 10-2009-0025568, filed on Mar. 25, 2009, and also claims the benefit of U.S. Provisional Application Ser. No. 61/119,381, filed on Dec. 3, 2008, the contents of which are all hereby incorporated by reference herein in their entirety.

TECHNICAL FIELD

The present invention relates to a wireless communication system, and more particularly, to scheduling performed in a wireless communication system employing a relay station and a data relay method based on the scheduling.

BACKGROUND ART

A wireless communication system may use a relay station (RS) to expand cell coverage and to improve transmission performance.

When a base station (BS) provides a service to a user equipment (UE) located outside the coverage of the BS by using the RS, the cell coverage can be expanded by allowing the RS to relay both a control signal and a data signal between the UE and the BS.

In addition, when the UE is located inside the coverage of the BS, transmission performance can be improved so that the UE can further reliably communicate with the BS by allowing the RS to amplify a data signal between the BS and the UE and to deliver the amplified data signal to each receiving end. In particular, the RS may be necessary when the UE is located in a shadow zone while being located inside the coverage of the BS.

That is, the institute of electrical and electronics engineers (IEEE) 802.16j standard allows a UE located outside the coverage of a BS to be able to receive a signal by using an RS, and allows an UE located inside the coverage of the BS to be able to configure a high-quality path with a high level of an adaptation modulation and coding (AMC) scheme, thereby increasing system capacity by using the same radio resource.

DISCLOSURE OF INVENTION

Technical Problem

It may be impossible or ineffective for a relay station to simultaneously perform a transmission operation and a reception operation at a specific time in a specific frequency band due to self-interference. Therefore, in order for the relay station to smoothly communicate with a base station or a user equipment connected to the relay station, the relay station has to alternately perform the transmission operation and the reception operation in an uplink or downlink frequency band.

However, since scheduling performed in consideration of effective resource utilization of the relay station, data transmission timing, HARQ process execution, and so on has not been sufficiently discussed, the present invention proposes scheduling for transmission of data or a signal, radio resource allocation, and effective radio resource utilization in an environment where the relay station is employed.

Technical Solution

According to an aspect of the present invention, a method of relaying data is provided. The method includes receiving, from a base station, scheduling information comprising information regarding a transmission time for transmitting uplink data from the relay station to the base station, receiving the uplink data from a user equipment, and relaying, to the base station, the uplink data at the transmission time determined depending on the scheduling information.

Advantageous Effects

According to embodiments of the present invention, uplink scheduling can be flexibly performed in an environment where a relay station is employed. In addition, radio resources can be effectively used to increase utilization of the radio resources.

MODE FOR THE INVENTION

Figure 1:
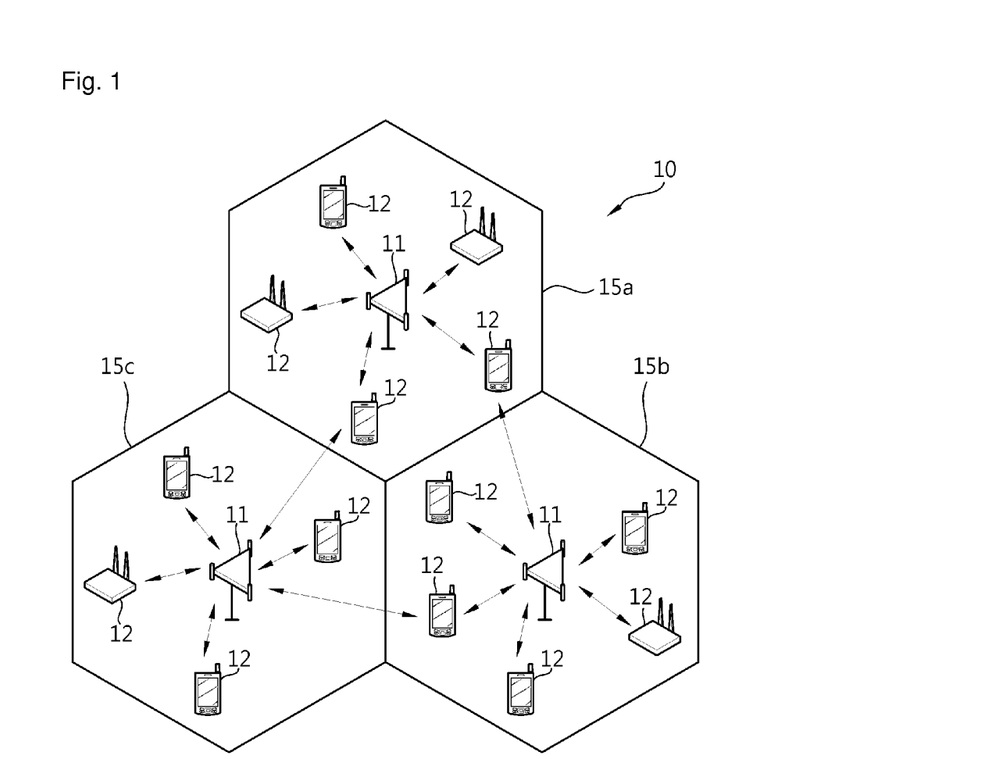
FIG. 1 shows a wireless communication system.

FIG. 1 shows a wireless communication system.
Referring to FIG. 1, a wireless communication system 10 includes at least one base station (BS) 11. Respective BSs 11 provide communication services to specific geographical regions (generally referred to as cells) 15a, 15b, and 15c. The cell can be divided into a plurality of regions (referred to as sectors).

A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink implies communication from the BS to the UE, and an uplink implies communication from the UE to the BS. In the downlink, a transmitter may be a part of the BS, and a receiver may be a part of the UE. In the uplink, the transmitter may be a part of the UE, and the receiver may be a part of the BS.

Figure 2:
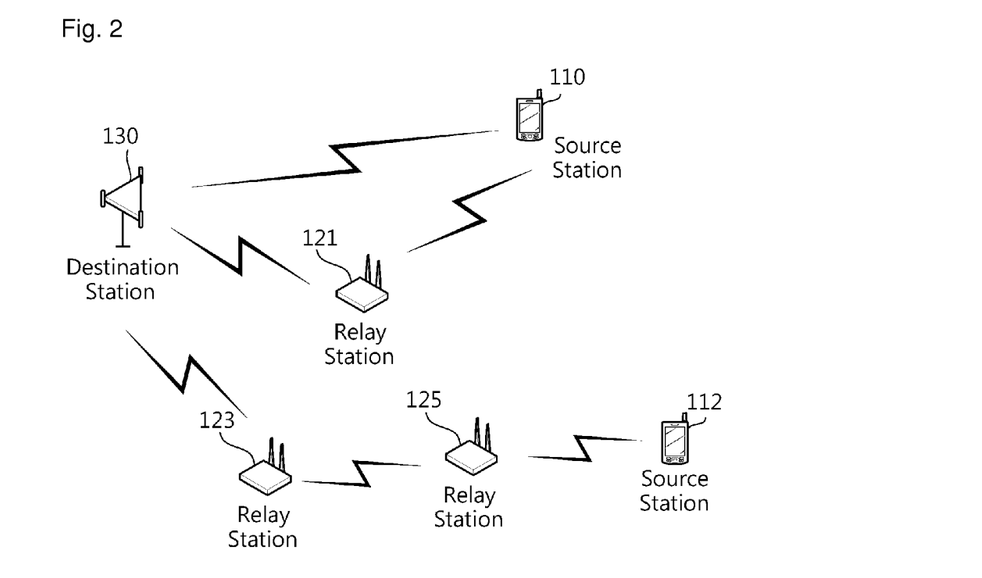
FIG. 2 shows a wireless communication system employing a relay station.

FIG. 2 shows a wireless communication system employing a relay station. For clarity of explanation, it is shown in FIG. 2 that the wireless communication system includes two source stations 110 and 112, one destination station 130, and three relay stations 121, 123, and 125. However, the numbers of destination stations, relay stations, and source stations included in the wireless communication system are not limited to any particular values.

In uplink transmission, the source station may be a UE, and the destination stations may be a BS. In downlink transmission, the source stations may be a BS, and the destination stations may be a UE. The relay station may be a UE, or may be provided as a separate relay station. The BS may perform functions such as connectivity, management, control, and resource allocation between the relay station and the UE.

When the UE (i.e., the source station 110) is located inside the coverage of the BS (i.e., the destination station 130), the UE can be connected to the BS in a direct link. However, if a distance between the UE and the BS is far or signal shielding is severe due to buildings or the like, or if the UE is located outside the coverage of the BS and thus a channel state with the BS is not good, communication with the BS may be achieved by using the relay stations 121, 123, and 125 within a cell so that communication is performed in a better channel state.

A relay scheme used in the relay stations may be either amplify and forward (AF) or decode and forward (DF), and the technical features of the present invention are not limited thereto.

Referring to FIG. 2, the source stations 110 and 112 communicate with the destination station 130 via the relay stations 121, 123, and 125. In uplink transmission, the source stations 110 and 112 transmit signals respectively to the destination station 130 and the relay station 121 or 125, and the relay station 121 or 125 relay-transmits the received signal to the destination station 130. In this case, the relay stations 121 and 125 can relay-transmit signals via another relay station 123.

Among the plurality of source stations 110 and 112, one source station 110 will be described hereinafter for example. Relay transmission is performed when the plurality of relay stations 121, 123, and 125 exist between the source station 110 and the destination station 130, and the source station 110 transmits data via one or a plurality of relay stations among the relay stations 121, 123, and 125. The relay transmission may result in increase in capacity of each link used for data transmission.

Figure 3:
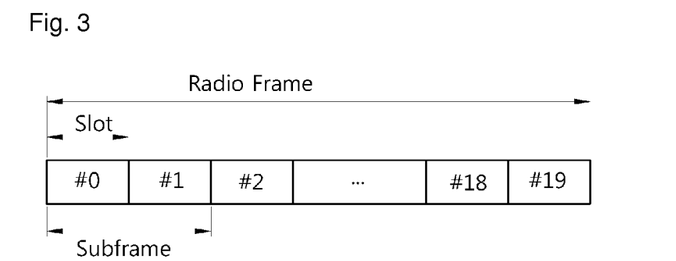
FIG. 3 shows a radio frame structure.

FIG. 3 shows a radio frame structure.

Referring to FIG. 3, a radio frame consists of 10 subframes, and one subframe consists of two slots. A transmission time interval (TTI) is defined as a time for transmitting one subframe. For example, one subframe may have a length of 1 millisecond (ms), and one slot may have a length of 0.5 ms.

The radio frame structure of FIG. 3 is for exemplary purposes only, and thus the number of subframes included in the radio frame, the number of slots included in the subframe, or the number of orthogonal frequency division multiplexing (OFDM) symbols included in the slot may change variously.

Figure 4:
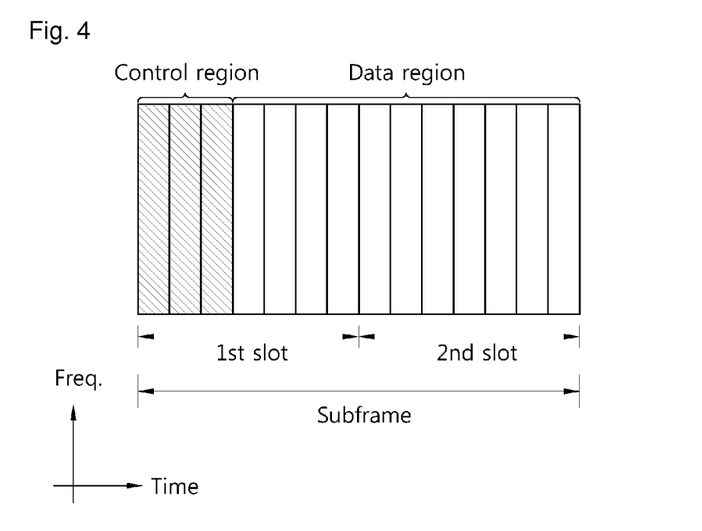
FIG. 4 shows an example of a downlink subframe structure.

FIG. 4 shows an example of a downlink subframe structure.

A subframe includes two consecutive slots. A maximum of three preceding OFDM symbols of a $1^{st}$ slot in a downlink subframe belong to a control region to be allocated with a physical downlink control channel (PDCCH). The remaining OFDM symbols belong to a data region to be allocated with a physical downlink shared channel (PDSCH).

Examples of downlink control channels used in $3^{rd}$ generation partnership project (3GPP) long term evolution (LTE) include a physical control format indicator channel (PCFICH), a physical downlink control channel (PDCCH), a physical hybrid-ARQ indicator channel (PHICH), etc. The PCFICH transmitted in a $1^{st}$ OFDM symbol of a subframe carries information regarding the number of OFDM symbols used for transmission of PDCCHs in the subframe.

The PHICH carries a hybrid automatic repeat request (HARM) acknowledgement (ACK)/not-acknowledgement (NACK) signal in response to uplink transmission. That is, an ACK/NACK signal for uplink data transmitted by a UE is transmitted over the PHICH.

Now, a PDCCH that is a downlink physical channel will be described.

The PDCCH carriers a downlink grant for informing a resource allocation of downlink transmission over a PDSCH. More specifically, the PDCCH can carry a downlink shared channel (DL-SCH)'s resource allocation and transmission format, paging information over a paging channel (PCH), system information over a DL-SCH, a resource allocation of a higher layer control message such as a random access response transmitted over a PDSCH, a transmit power control command, activation of a voice over Internet (VoIP), etc.

A plurality of PDCCHs can be transmitted in a control region, and a UE can monitor the plurality of PDCCHs. In addition, the PDCCH can carry an uplink grant so that the UE is informed of a resource allocation of uplink transmission.

The PDCCH is transmitted over an aggregation of one or several consecutive control channel elements (CCEs). The CCE corresponds to a plurality of resource element groups. For example, the CCE may correspond to 9 resource element groups. The resource element group is used to define mapping of a control channel to resource elements. For example, one resource element group may consist of four resource elements. According to an association relation between the number of CCEs and a coding rate provided by the CCEs, a format of the PDCCH and the number of bits of an available PDCCH are determined.

Control information transmitted through the PDCCH is referred to as downlink control information (DCI). The DCI indicates uplink resource allocation information, downlink resource allocation information, an uplink transmit power control command for any UE groups, etc.

The following table shows the DCI according to a DCI format.

TABLE 1

| DCI format | Description |
| --- | --- |
| Format 0 | used for the scheduling of PUSCH(uplink grant) |
| Format 1 | used for the scheduling of PDSCH codeword |
| Format 1A | used for the compact scheduling of PDSCH codeword |
| Format 1C | used for very compact scheduling of PDSCH codeword |
| Format 2 | used for the scheduling of PDSCH to UEs configured in spatial multiplexing mode |

TABLE 1-continued

| DCI format | Description |
|---|---|
| Format 3 | used for the transmission of TPC commands for PUCCH and PUSCH with 2-bit power adjustments |
| Format 3A | used for the transmission of TPC commands for PUCCH and PUSCH with single bit power adjustments |

A DCI format 0 represents resource allocation information for uplink transmission, and is used for the scheduling of the PUSCH (uplink grant). DCI formats 1 to 2 represent downlink resource allocation information, and are used for the scheduling of the PUSCH codeword. DCI formats 3 and 3A represent an uplink transmit power control (TPC) command for any UE groups. The uplink resource allocation information may be transmitted to a UE or a relay station by being included in a scheduling message to be described below.

Regarding information elements included in the DCI format 0, that is, uplink resource allocation information (or uplink grant), the section 5.3.3.1 of 3GPP TS 36.212 V8.3.0 (2008-05) "Technical Specification Group Radio Access Network; Evolved Universal Terrestrial Radio Access (E-UTRA); Multiplexing and channel coding (Release 8)" may be incorporated herein by reference.

The uplink grant is control information for uplink data scheduling, and includes a resource allocation field. The resource allocation field indicates a radio resource for uplink data transmission. The radio resource may be a time-frequency resource. In 3GPP LTE, the radio resource allocated by the resource allocation field is a resource block. The resource allocation field may consist of a resource block index corresponding to a starting resource block and the number of allocated resource blocks.

Alternatively, the resource allocation field may be only a resource block index. The resource allocation field may be used to indicate a position of a resource block allocated for uplink data transmission, the number of resource blocks, etc.

In addition, the uplink grant may include a hopping flag to indicate whether frequency hopping is performed in a data region of a subframe. If the hopping flag does not indicate hopping, the UE is allocated with a resource block indicated by the resource allocation field both in a $1^{st}$ slot and a $2^{nd}$ slot of the subframe. Otherwise, if the hopping flag indicates hopping, the UE transmits uplink data by using a resource block indicated by the resource allocation field in the $1^{st}$ slot of the subframe. Further, the UE transmits uplink data by using a resource block which is frequency-hopped in the data region from the resource block in the $2^{nd}$ slot of the subframe.

In addition thereto, the uplink grant may further include a flag for distinguishing the uplink grant from other control information, a transport format field for indicating a transport format of the uplink data, a new data indicator (NDI) for indicating whether the uplink grant is for transmission of new uplink data or retransmission of the uplink data, a transmit power control (TPC) command field for controlling uplink transmit power, a cyclic shift field for indicating cyclic shift of a demodulation reference signal, and a channel quality indicator (CQI) request indicator for indicating whether a CQI is requested.

Meanwhile, the PCFICH reports the number of OFDM symbols used for PDCCHs to the UE, and is transmitted in every subframe. A physical hybrid ARQ indicator channel (PHICH) carriers an HARQ ACK/NACK signal in response to uplink transmission.

Figure 5:
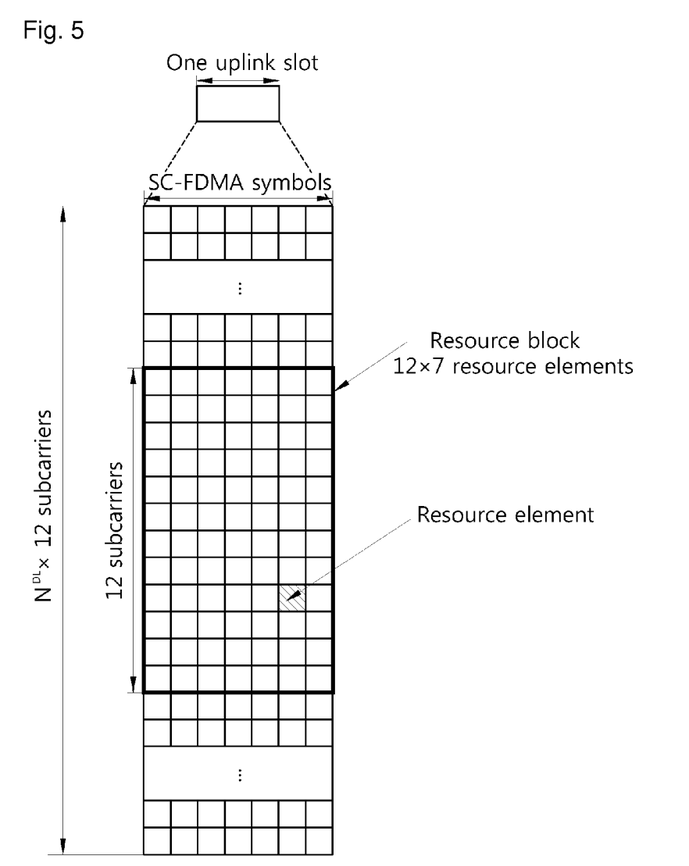
FIG. 5 shows an example of a resource grid for one uplink slot.

FIG. 5 shows an example of a resource grid for one uplink slot.

Referring to FIG. 5, an uplink slot includes a plurality of single carrier-frequency division multiple access (SC-FDMA) symbol in a time domain and includes a plurality of resource blocks (RBs) in a frequency domain. In a resource grid structure shown in FIG. 5, 3GPP LTE is exemplified and thus it has been described that one uplink slot includes 7 SC-FDMA symbols and one resource block includes 12 sub-carriers. However, this is for exemplary purposes only, and thus the present invention is not limited thereto.

Each element on the resource grid is referred to as a resource element, and one resource block (RB) includes 12×7 resource elements. The number $N^{UL}$ of RBs included in the uplink slot depends on an uplink transmission bandwidth determined in a cell.

Figure 6:
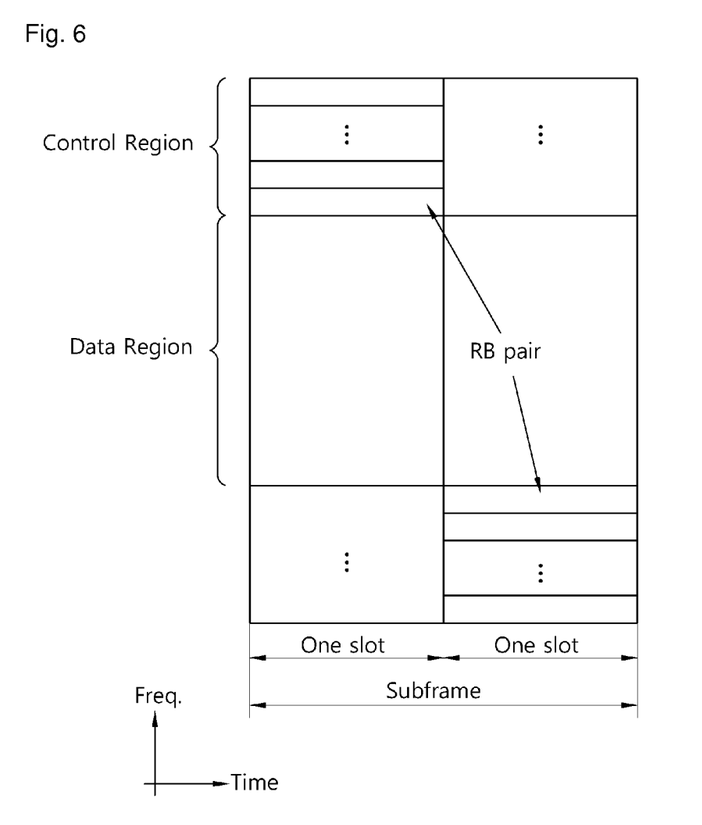
FIG. 6 shows an uplink subframe structure in $3^{rd}$ generation partnership project (3GPP) long term evolution (LTE).

FIG. 6 shows an uplink subframe structure in 3GPP LTE.

Referring to FIG. 6, an uplink subframe can be divided into a control region and a data region in a frequency domain. The control region is allocated with a physical uplink control channel (PUCCH) for carrying uplink control information. The data region is allocated with a physical uplink shared channel (PUSCH) for carrying user data.

The PUCCH for one UE is allocated in an RB pair. RBs belonging to the RB pair occupy different subcarriers in each of two slots. This is called that the RB pair allocated to the PUCCH is frequency-hopped in a slot boundary.

Figure 7:
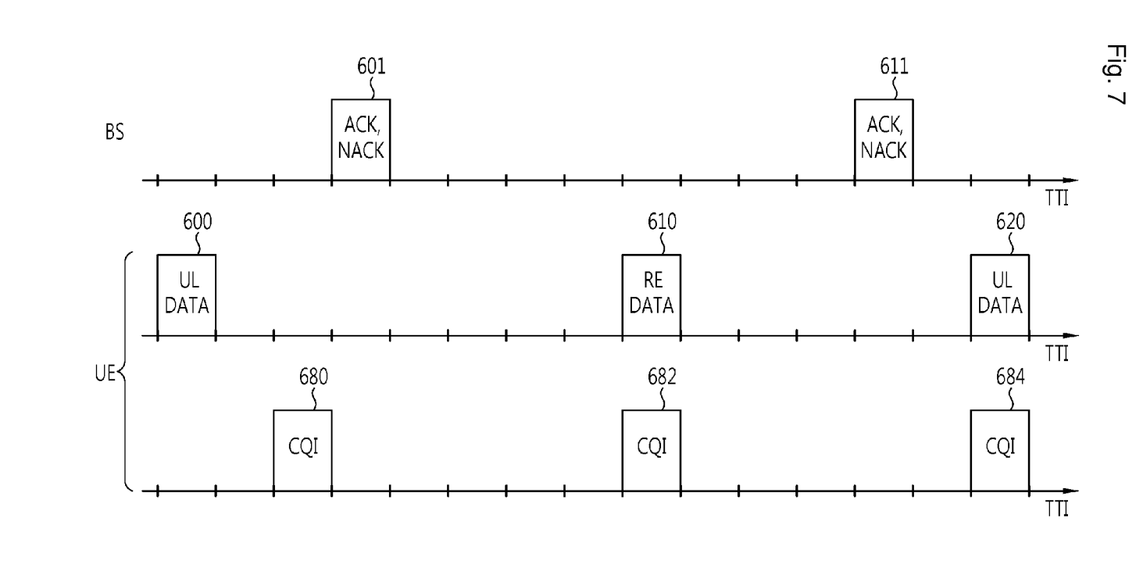
FIG. 7 shows uplink hybrid automatic repeat request (HARQ) and channel quality indicator (CQI) transmission.

FIG. 7 shows uplink HARQ and CQI transmission.

Referring to FIG. 7, a BS receives uplink data 600 from a UE over a PUSCH, and transmits an ACK/NACK signal 601 for the uplink data 600 over a PHICH after a specific time elapses. Upon receiving the uplink data 600, the BS may transmit the PHICH after a time corresponding to 4 TTIs elapses. However, the present invention is not limited thereto. The ACK/NACK signal 601 is an ACK signal when the uplink data is successfully decoded, and is an NACK signal when the uplink data is unsuccessfully decoded. When the ACK/NACK signal 601 is determined to be an NACK signal, the UE retransmits retransmission data 610 for the uplink data 600 to the BS. Retransmission may be performed until the ACK signal is received or may be performed several times, i.e., up to a maximum retransmission number. If an ACK/NACK 611 for the retransmission data 610 is determined to be an ACK signal, the UE may transmit new uplink data 620 to the BS.

A resource allocation or a transmission time of an ACK/NACK signal for uplink/downlink data may be dynamically reported by the BS through signaling, or may be agreed in advance according to a resource allocation or a transmission time of uplink/downlink data.

The UE may measure a downlink channel state to report a CQI to the BS periodically and/or aperiodically. Periodic CQI report implies that the CQI is transmitted without an additional request from the BS according to either a period given by the BS or a predetermined period. Aperiodic CQI report implies that the CQI is transmitted in response to a request from the BS. The CQI may be transmitted over a PUCCH or a PUSCH. However, when the CQI is multiplexed together with data, the CQI is always transmitted over the PUSCH. CQIs 680 and 684 transmitted alone may be transmitted over the PUCCH or the PUSCH. A CQI 682 transmitted together with uplink data may be transmitted only over the PUSCH. The CQI transmitted over the PUSCH may be a periodic CQI or an aperiodic CQI. The BS may use the CQI in downlink scheduling.

Although HARQ of uplink transmission will be described hereinafter, it will be easily understood by those skilled in the art that the technical features of the present invention can also apply to HARQ of downlink transmission.

Figure 8:
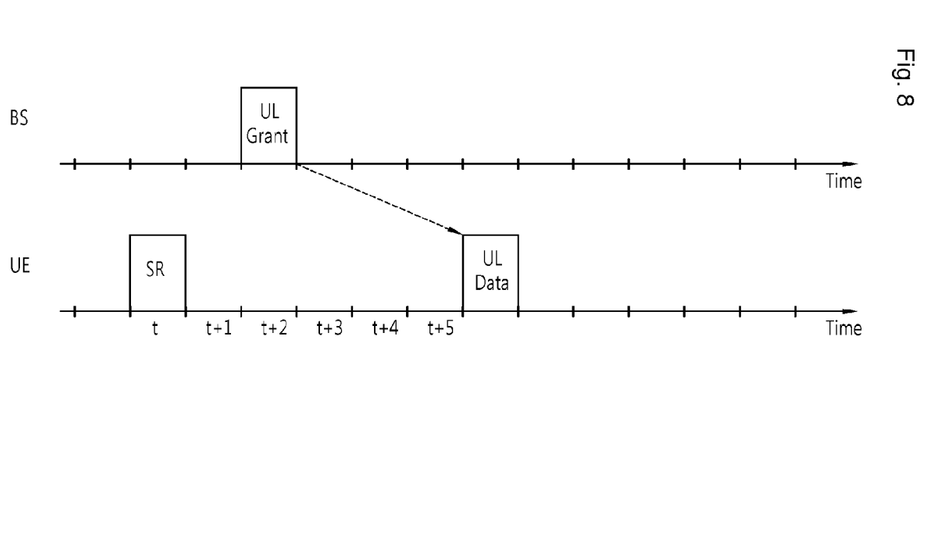
FIG. 8 shows dynamic scheduling in uplink transmission.

FIG. 8 shows dynamic scheduling in uplink transmission.

Referring to FIG. 8, for uplink transmission, a UE first transmits a scheduling request (SR) to a BS over a PUCCH. The SR is used when the UE requests the BS to allocate uplink radio resources, and is a sort of preliminary information exchange for data exchange. In order for the UE to transmit uplink data to the BS, the UE firsts requests allocation of the radio resources by using the SR. In response to the SR, the BS sends an uplink grant to the UE over a PDCCH. The uplink grant includes allocation of an uplink radio resource. The UE transmits uplink data over a PUSCH by using the allocated uplink radio resource.

Figure 9:
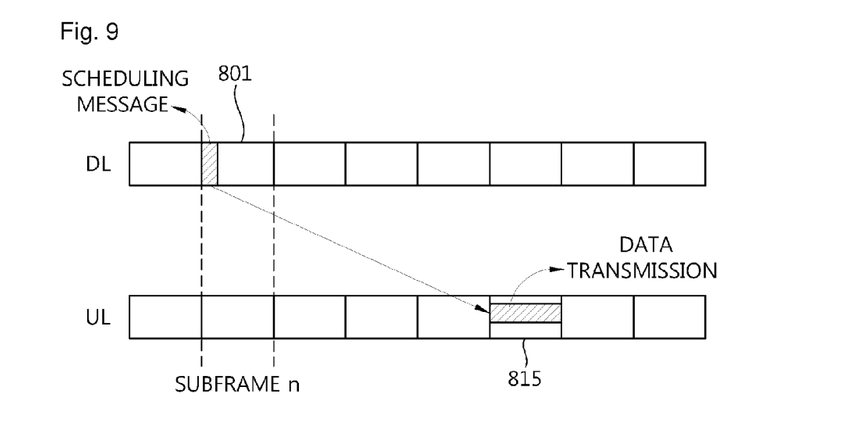
FIG. 9 shows a subframe for conventional uplink data transmission.

FIG. 9 shows a subframe relation for conventional uplink data transmission.

In FIG. 9, a subframe is a basic unit of uplink and downlink transmissions as in a 3GPP E-UTRA system. The subframe is shown distinctively from the perspective of a BS and from the perspective of a UE.

In the conventional technique, a transmission time is fixed when a BS or a relay station (RS) schedules uplink transmission of a UE (or RS) belonging to the coverage of the BS or the RS. For example, in case of the 3GPP E-UTRA system, the BS transmits a scheduling message including uplink radio allocation information to a specific UE in a subframe n (i.e., an $n^{th}$ subframe) 801 through a physical downlink control channel (PDCCH), and then the UE transmits uplink data to the BS in a subframe n+4 815, i.e., a subframe delayed by four subframes from the subframe n, through a physical uplink shared channel (PUSCH).

The PDCCH includes information such as an index of a resource allocated for PUSCH transmission, a modulation and coding scheme to be used, a transmission power control command, etc. However, information on a subframe in which PUSCH transmission is performed is not included in the PDCCH. This is because a time interval between a transmission time of the PUSCH and a transmission time of the PDCCH is fixed.

That is, referring to FIG. 9, the PUSCH transmission time cannot be flexibly changed in the conventional technique. In particular, such a problem significantly appears in an environment where an RS is employed, which will be described below. In general, there are many cases where the RS cannot perform a transmission operation and a reception operation simultaneously at a specific time at a specific frequency band due to self-interference, or the use of the RS may be ineffective in terms of costs. For example, if RS is currently transmitting a downlink signal in a specific subframe in a specific frequency band, the RS cannot receive a downlink signal transmitted by a BS.

For the reason described above, in order for the radio RS to smoothly communicate with the BS or a UE connected to the RS itself, the RS has to alternately perform the transmission operation and the reception operation in an uplink or downlink frequency band. That is, the RS cannot simultaneously perform downlink reception from the BS and downlink transmission to the UE. And the RS cannot simultaneously perform uplink reception from the UE and uplink transmission to the BS. Therefore, the RS terminates transmission or reception in an uplink or downlink band at a specific time (i.e., a specific subframe).

For example, if the RS temporarily terminates transmission in a downlink band from the RS to the UE in order to receive a downlink signal from the BS in the subframe n 801, it can be called that the subframe n is blanked from the perspective of downlink transmission of the RS. In this case, a scheduling message (existing in a PDCCH) for scheduling uplink transmission of the subframe n+4 815 cannot be delivered, which results in deterioration of resource utilization.

In order to compensate for a shortcoming of the blank subframe, a concept of a partial blank may be introduced in which only a part of a subframe is allocated for transmission of a specific signal and transmission is terminated at a time corresponding to the remaining parts of the subframe. That is, the RS transmits a signal to the UE in the control region of FIG. 4 and receives a signal transmitted by the BS by designating the data region of FIG. 4 as a blank. Therefore, advantageously, a control signal can be transmitted unlike in a case of designating one whole subframe as a blank. Disadvantageously, however, an additional method is required to deliver the control signal to RS since the control signal cannot be received from the BS.

In order for the RS to receive a signal of the BS, a subframe is designated as a blank subframe or a partial blank subframe. In an embodiment of designating the subframe as the partial blank subframe, the RS may configure the subframe as an MBMS single frequency network (MBSFN) subframe of a 3GPP E-UTRA system.

Figure 10:
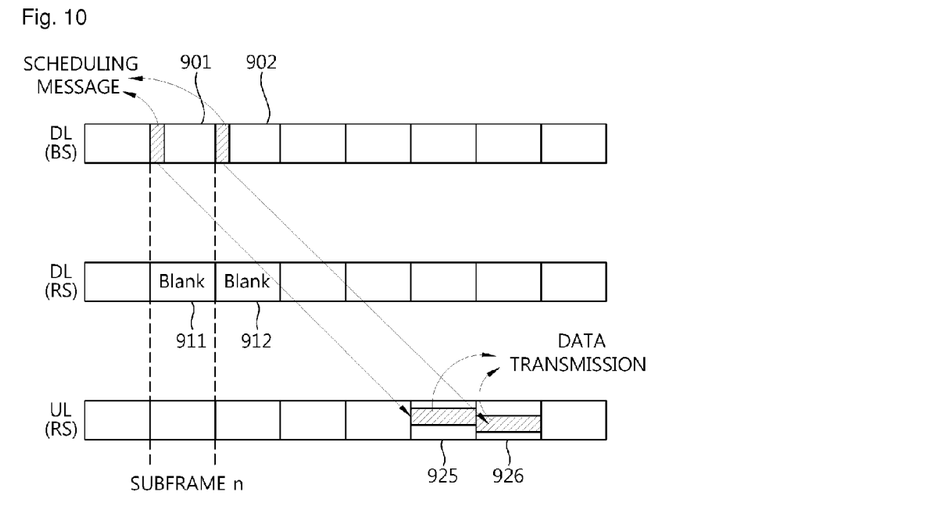
FIG. 10 shows a subframe when a wireless communication system employing a relay station relays uplink data of the relay station according to a conventional technique.

FIG. 10 shows a subframe timing relation when a wireless communication system employing an RS relays uplink data of the RS according to a conventional technique.

Herein, a subframe for downlink transmission of a BS, a subframe for downlink transmission from an RS to a UE, and a subframe for uplink transmission from the RS to the BS are shown in turn.

The RS receives a scheduling message from the BS in order to relay uplink data transmission to the BS. Therefore, if an uplink data transmission time is fixedly determined according to the conventional technique, the scheduling message of the BS has to be received always in a subframe which is prior to the uplink data transmission time by 4 subframes. In a subframe in which the RS receives a downlink signal corresponding to the scheduling message from the BS, data transmission between the RS and the UE is temporarily terminated.

For example, it is assumed that uplink transmission needs to be performed from the RS to the BS throughout two subframes (e.g., a subframe n+4 925 and a subframe n+5 926) due to a large amount of uplink data.

In this case, downlink transmission from the RS to the UE according to the conventional technique is temporarily terminated in a subframe n 911 and a subframe n+1 912. Therefore, the subframe n 911 and the subframe n+1 912 are marked as 'blank' in FIG. 10. This is because the RS receives a scheduling message from the BS in the subframe n 901 and the subframe n+1 902. If a partial blank mechanism is used, the scheduling message delivered by the BS to the RS is transmitted together with data delivered by the BS to the RS by being included in a data region of the subframes n and n+1.

However, if an amount of data to be delivered by the BS to the RS is less than an amount of uplink data, the RS has to terminate downlink transmission to the UE during a time corresponding to a larger number of subframes than necessary, which implies that radio resources are ineffectively used.

Figure 11:
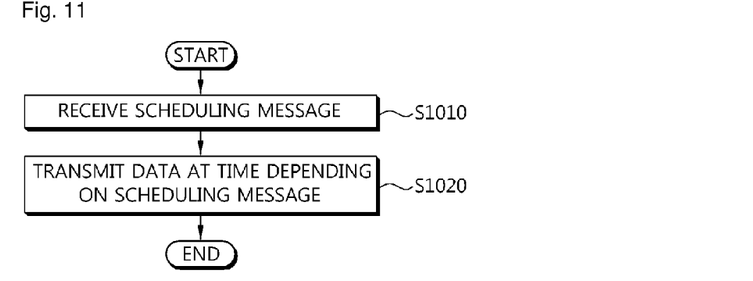
FIG. 11 is a flowchart showing a scheduling method according to an embodiment of the present invention.

FIG. 11 is a flowchart showing a scheduling method according to an embodiment of the present invention.

The scheduling method according to the embodiment of the present invention can be applied to various scenarios. For example, the scheduling method according to the embodiment of the present invention can be used to perform scheduling for transmission of uplink data of an RS or transmission of ACK/NACK for downlink data transmitted by a BS to the RS.

When the BS delivers an uplink scheduling message to the RS or a UE, other information can be transmitted together, such as information on a time of performing uplink data transmission, information on a time of transmitting ACK/NACK for uplink data, and/or information on a frequency resource and a time resource to be used. Information on the time of transmitting uplink data or ACK/NACK may be information indicating a specific subframe in which data or a signal is transmitted.

That is, the BS may transmit a scheduling message for uplink data transmission together with a scheduling message for ACK/NACK. Then, upon receiving the scheduling messages, the RS can know when ACK/NACK for the uplink data transmitted to the BS by the RS will be transmitted from the BS according to the scheduling messages.

The scheduling method according to the embodiment of the present invention can also apply to a case where a blank or a partial blank appears in a specific subframe and a case where a scheduling message or its associated data is not transmitted at a proper time. Therefore, efficiency of radio resources usage can be increased.

First, the RS or the UE receives a scheduling message (step S1010). Although the scheduling message can be received from the RS or the BS, it is assumed in the present embodiment that the UE receives the scheduling message from the RS and the RS receives the scheduling message from the BS.

According to the embodiment of the present invention, a new field may be added to the scheduling message transmitted from the BS to the RS. The new field includes information on a time of transmitting data according to the scheduling message. The new field including information on the time of transmitting data is referred to as a scheduling field. The information on the time of transmitting data is referred to as scheduling information. Herein, data of which a transmission time is scheduled according to the scheduling message may be ACK/NACK or uplink data transmitted by the UE to the RS or may be ACK/NACK or uplink data transmitted by the RS to the BS.

The RS terminates uplink transmission to the BS at a time of receiving uplink data from the UE according to the scheduling information. Hereinafter, a time in which the RS receives uplink data from the UE according to the scheduling information can be simply referred to as a 'transmission time' for convenience of explanation.

Several signals or data may be scheduled according to the scheduling information. Therefore, plural pieces of information on the transmission time may be included in the scheduling information.

The scheduling information may indicate the transmission time by specifying a subframe. According to the scheduling information included in the scheduling field, the UE or the RS transmits uplink data at a designated transmission time (step S1020). Although uplink data can be transmitted at the transmission time according to the scheduling information as mentioned above, ACK/NACK may also be transmitted according to the scheduling information.

Herein, a field value of the scheduling field may be a value indicating the scheduling information. Uplink transmission of the UE or the RS is performed in a subframe designated by the field value. Alternatively, a time interval between a transmission time of the scheduling message and a transmission time of the uplink data is decreased or increased according to the field value. In this case, the transmission time of the uplink data may be advanced or delayed from the conventional fixed time according to the field value. That is, a predetermined time interval between the transmission time of the scheduling message and its associated data transmission time is regulated by the field value.

Accordingly, the time interval between the transmission time of the scheduling message and the data transmission time can be flexibly regulated. Upon receiving the uplink data of the UE, the RS relay-transmits subsequent uplink data to the BS.

Figure 12:
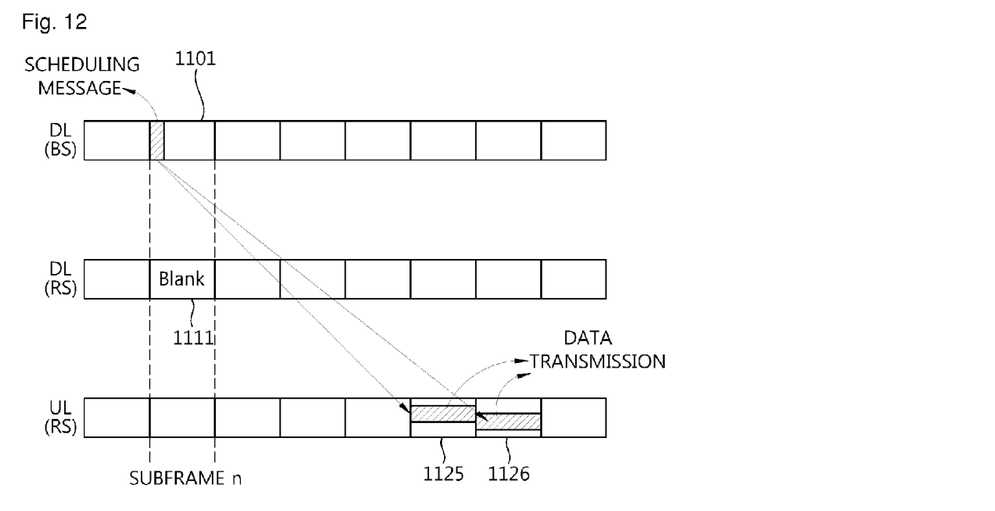
FIG. 12 shows a radio frame when a scheduling method is used according to an embodiment of the present invention.

FIG. 12 shows a radio frame when a scheduling method is used according to an embodiment of the present invention.

Referring to FIG. 12, a subframe indicating downlink transmission from a BS to an RS, a subframe indicating downlink transmission from the RS to a UE, and a subframe indicating uplink transmission from the RS to the BS are shown in turn.

In this case, a result expected by applying the present invention is that the RS transmits several uplink scheduling messages by terminating downlink transmission during only one subframe. Therefore, resources can be further effectively utilized.

For example, if not only a scheduling message for a subframe n+4 1125 but also a scheduling message for a subframe n+5 1126 can be delivered in a subframe n 1101 which is blanked for downlink transmission, the RS can obtain a necessary amount of uplink scheduling information from the BS by terminating transmission from the RS to the UE only in a subframe n 1111. If a partial blank mechanism is used in the embodiment of the present invention, the scheduling message delivered from the BS to the RS may be transmitted together with data delivered by the BS to the RS by being included in a data region of the subframe n 1101.

Meanwhile, in a wireless communication system employing the RS, an additional field for flexibly regulating a transmission time of uplink data may be provided in an uplink scheduling message transmitted in a downlink according to the embodiment of the present invention. Such a field is referred to as a scheduling field.

The scheduling field includes scheduling information that is information capable of indicating a time of transmitting uplink data corresponding to the transmitted uplink scheduling message, that is, information capable of indicating in which subframe the uplink data is transmitted. That is, the scheduling field indicates scheduling information that is information regarding a time of transmitting data after transmission of the scheduling message. The scheduling field may use an existing field or may be added to the scheduling message.

That is, in the case described above, scheduling information regarding scheduling for transmission of uplink data of the subframe n+4 1125 and scheduling information regarding transmission of uplink data of the subframe n+5 1126 can be both included in the scheduling field.

The scheduling information included in the scheduling field may be an offset value between a scheduling message reception time and an uplink transmission time. For example, if the field value of the scheduling field indicates 3, a transmission time of uplink data corresponding to a scheduling message received in an $n^{th}$ subframe (i.e., a subframe n) may be defined as a subframe n+3 delayed by three subframes from the subframe n.

Information on the uplink transmission time may be the aforementioned offset value or a regulation value for regulating the conventional fixed transmission time. For example, in a case where the fixed transmission time of the uplink data is a subframe delayed by 4 subframes from the transmission time of the scheduling message, if a field value of the $n^{th}$ subframe in which the scheduling message is transmitted indicates −1, the regulated transmission time may be defined to be a subframe n+3 delayed by 3 subframes from the subframe n. Herein, n+3 is derived from n+4+(−1), where (−1) is a field value of the aforementioned scheduling field and takes a role of a regulation value for regulating the fixed transmission time.

Such a new field can be added to the exiting uplink scheduling message. In case of 3GPP E-UTRA, the new field may be added to a field of a PDCCH. Alternatively, a scheduling message with a new format may be defined to indicate an uplink transmission time. For example, a new uplink scheduling message may be defined in a region for transmission of a PDSCH.

The embodiment of the present invention may be used as a method of preventing collision between transmission of the RS and transmission of the UE when the RS must receive a signal transmitted by the UE connected to the RS itself at the conventional fixed uplink transmission time.

For example, in case of FIG. 12, if the RS must receive a signal transmitted from the UE in the subframe n+4 1125 and the RS achieves no communication with the UE in the subframe n+5 1126, then the BS can flexibly regulate an uplink transmission time of the RS. And thus the RS can perform uplink transmission to the BS in the subframe n+5 1126 by using a scheduling message transmitted in the subframe n 1101.

When the uplink transmission time between the BS and the RS is flexibly regulated, it is important to prevent interference in communication with the RS and the UE connected to the RS. In the 3GPP LTE system, the UE may use a synchronous HARQ process when transmitting uplink data to the BS or the RS.

The UE performs uplink transmission in one subframe, and attempts retransmission after a specific time interval elapses when an error occurs. The RS may transmit a message for reporting the set of HARQ processes, which is currently used for communication with the UE, to the BS. The message for reporting set of HARQ processes may comprise a HARQ period. A HARQ period is a period used to perform HARQ by a HARQ process. The HARQ period comprises a time interval between initial transmission and retransmission for the initial transmission or between initial transmission and a ACK/NACK reception of the initial transmission.

Alternatively, the BS allows the RS to designate a set of HARQ processes that can be used for communication with the UE, and the RS may perform communication with the UE by using all or some of the set of HARQ processes. In addition to the HARQ processes described above, the RS may periodically exchange information regarding semi-persistent scheduling for allocating constant uplink resources to the UE.

That is, the RS may report a set of resource, which is currently allocated to the UE by the RS itself, to the BS. Alternatively, the BS may designate a set of available resource to the RS. In doing so, the BS can know in which subframe the RS does not communicate with the UE. Therefore, the BS can schedule uplink transmission of the RS so that the RS transmits uplink data to the BS in a subframe which is not used by the RS in communication with the UE.

Figure 13:
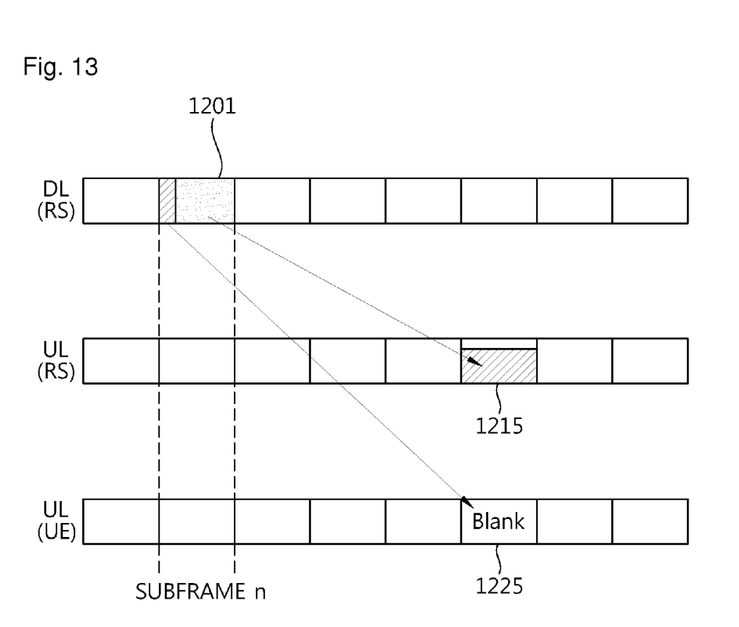
FIG. 13 shows a case where downlink transmission of a relay station is partially blanked.

FIG. 13 shows a case where downlink transmission of an RS is partially blanked. It will be described with reference to FIG. 13 and FIG. 14 that a time of transmitting uplink data by a UE to the RS may also be flexibly changed.

Referring to FIG. 13, a subframe indicating downlink transmission from an RS to a UE, a subframe indicating uplink transmission from the RS to a BS, and a subframe indicating uplink transmission from the UE to the RS are shown in turn.

It has been described above that waste of resources may occur when the RS receives data or a signal via downlink transmission of the BS in a specific subframe in such a manner that downlink transmission of the RS in that subframe is treated as a blank whenever downlink transmission of the BS is performed.

That is, it is assumed that downlink data transmission from the RS to the UE is partially blanked in a subframe n 1201. In this case, the RS allocates a part the subframe n 1201 (indicated by a slashed line) to transmit a variety of control information to the UE. Most parts of the control information are occupied by several uplink and/or downlink transmission scheduling messages.

As such, when only a part of a subframe is allocated for transmission of a specific signal and transmission is terminated in a time corresponding to the remaining parts of the subframe, it can be called that the subframe is partially blanked. That is, in the subframe n 1201 for downlink transmission from the RS to the UE, only a slashed part is allocated for control information transmission and the remaining parts are empty, and thus it can be called that the subframe is partially blanked. The RS receives a signal transmitted from the BS by using the empty part of the subframe n 1201.

However, since the RS does not transmit downlink data to the UE in the subframe n 1201 (e.g., in case of an LTE system), a downlink scheduling message does not exist in the subframe n 1201. If the RS transmits ACK to the BS after four subframes elapse in response to a signal or data received from the BS in a specific subframe, the UE cannot transmit uplink data to the RS in a subframe n+4 1225. Therefore, the subframe n+4 1225 for transmission from the UE to the RS is marked as 'blank' in FIG. 13. As a result, an uplink scheduling message for the subframe n+4 1225 is not transmitted in the subframe n.

Accordingly, if a transmission time of uplink data is determined according to the conventional fixed method, when a partial blank is formed by the RS, no control signal is transmitted in a region for transmitting control information in a specific subframe, thereby causing waste of radio resources.

Figure 14:
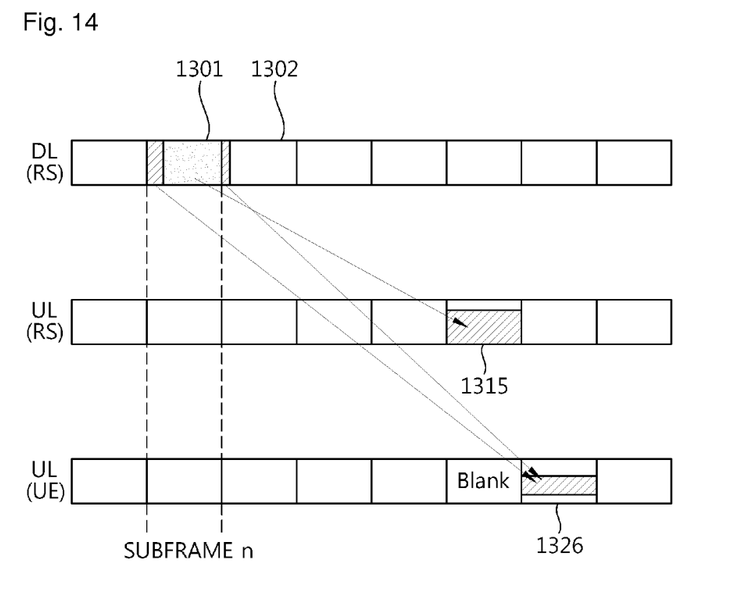
FIG. 14 shows a radio frame when a scheduling method is used according to an embodiment of the present invention.

FIG. 14 shows a radio frame when a scheduling method is used according to an embodiment of the present invention.

Referring to FIG. 14, a subframe indicating downlink transmission from an RS to a UE, a subframe indicating uplink transmission from the RS to a BS, and a subframe indicating uplink transmission from the UE to the RS are shown in turn.

If data corresponding to an uplink scheduling message transmitted by the RS in a subframe n 1301 can be transmitted in a subframe other than a subframe n+4 1315, the aforementioned waste of resources can be prevented. For example, as shown in FIG. 14, if an uplink scheduling message for data transmission not only in the subframe n+4 1315 but also in a subframe n+5 1326 can be delivered in the subframe n 1301 which is partially blanked to transmit control information including a scheduling message, resource utilization of the subframe n 1301 can be increased.

In this case, less scheduling messages may be transmitted in a subframe n+1 1302. However, if the subframe n+1 1302 is a normal subframe which is not partially blanked, an amount of resources allocated to the control signal can be dynamically adjusted. Therefore, such a case can be adaptively handled according to the decreased scheduling messages. That is, flexible handling is possible. For example, an amount of data can be increased to the extent of the decreased scheduling messages to be transmitted.

Referring to FIG. 14, the RS transmits control information to the UE in the subframe n 1301, and the control information includes a scheduling message for the subframe n+5 1326. If the control information or the scheduling message is not completely transmitted in the subframe n 1301, the control information or the scheduling message can be further transmitted in the subframe n+1 1302.

Therefore, the RS transmits data to the BS in the subframe n+4 1315, and the UE transmits uplink data to the RS in the subframe n+5 1326 according to the content of the scheduling message.

In this case, in the subframe n+4 1315, uplink data transmission from the UE to the RS is temporarily terminated. According to the scheduling message transmitted by the RS in the subframe n 1301, the RS receives uplink data from the UE in the subframe n+5 1326.

Figure 15:
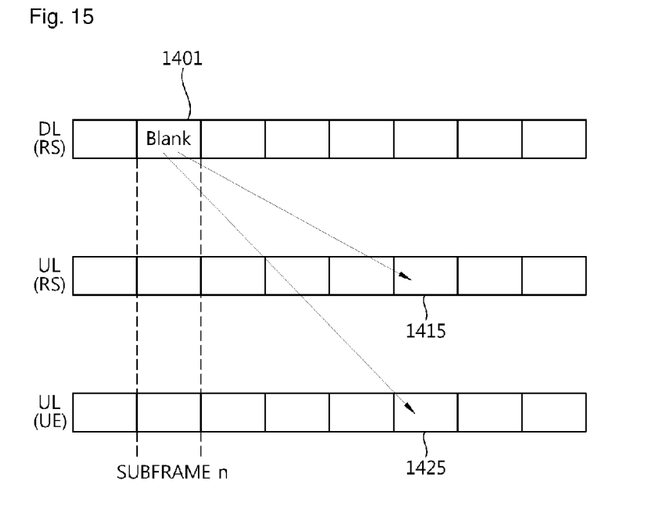
FIG. 15 shows a radio frame when downlink transmission from a base station to a relay station is blanked according to an embodiment of the present invention.

FIG. 15 shows a radio frame when downlink transmission from a BS to an RS is blanked according to an embodiment of the present invention. Referring to FIG. 15, a subframe indicating downlink transmission from an RS to a UE, a subframe indicating uplink transmission from the RS to a BS, and a subframe indicating uplink transmission from the UE to the RS are shown in turn.

In a subframe n 1401, the RS temporarily terminates downlink transmission to the UE to receive a signal from the BS. The RS is in a state where no data or signal (e.g., a scheduling message, etc.) is transmitted from the BS to the RS even though the RS has waited for transmission of the BS.

In this case, if the conventional fixed uplink transmission time is applied, uplink transmission from the UE to the RS is possible after four subframes elapse. This is because the RS does not have to transmit ACK/NACK or data to the BS.

However, since the UE fails to receive an uplink scheduling message in the subframe n, uplink data transmission from the UE to the RS is not performed in a subframe n+4 1425.

Such a situation can be explained also in other examples. For one example, the RS temporarily terminates downlink transmission to the UE and receives a signal transmitted from the BS in the subframe n 1401, but does not transmit ACK for reception in a subframe n+4 1415 by applying an ACK policy different from the conventional technique. The different ACK policy may be a block ACK policy in which the BS transmits an ACK request for previously transmitted several pieces of data and transmits a response thereof to the RS.

In addition thereto, the above situation may occur when a traffic amount is significantly different between a downlink and an uplink. For example, assume that two subframes are required to transmit downlink traffic by the BS to the RS but one subframe is enough to transmit uplink traffic by the RS to the BS. In this case, two downlink subframes are blanked. However, in uplink transmission, only one subframe is blanked whereas a subframe corresponding to the other blank subframe can be used to receive signals transmitted from UEs connected to the RS by using a method of designating a flexible uplink transmission time.

If the RS can transmit a scheduling message in a time other than the subframe n, wherein the scheduling message is for receiving uplink data from the UE in the subframe n+4 1415, then the RS can receive uplink data of the UE even in the subframe n+4 1425, thereby further increasing utilization of radio resources. This method will be described below with reference to FIG. 16.

Figure 16:
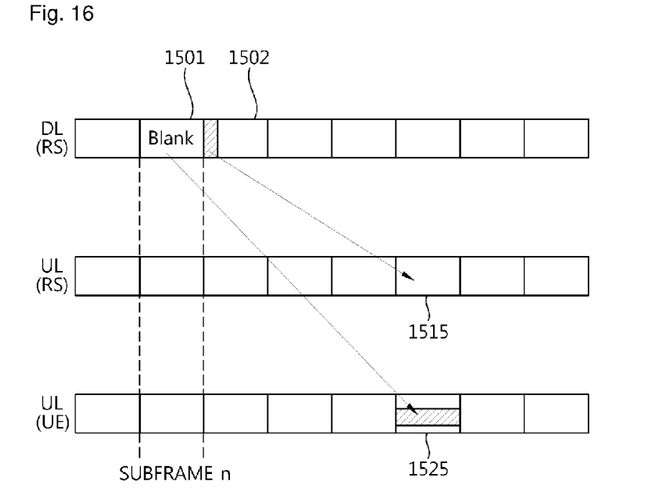
FIG. 16 shows a radio frame when a scheduling method is used according to another embodiment of the present invention.

FIG. 16 shows a radio frame when a scheduling method is used according to another embodiment of the present invention.

Referring to FIG. 16, a subframe indicating downlink transmission from an RS to a UE, a subframe indicating uplink transmission from the RS to a BS, and a subframe indicating uplink transmission from the UE to the RS are shown in turn.

It is assumed herein that, in a subframe n 1501, the RS determines that there is no need to transmit an uplink signal to the BS in a subframe n+4 1515.

That is, in the subframe n 1501, no downlink transmission is performed from the RS to the UE, or no scheduling message is transmitted. Accordingly, in the subframe n+4 1515, uplink data from the RS to the BS is not transmitted.

Therefore, from the perspective of the UE and the RS, uplink transmission from the UE to the RS is possible in a subframe n+4 1525 in this case, and thus there is no need to terminate uplink transmission of the UE.

However, according to the conventional technique, uplink data transmitted by the UE in the subframe n+4 1525 can be received by the RS only when the UE receives a scheduling message in the subframe n 1501. This is impossible since downlink transmission from the RS to the UE is terminated in the subframe n 1501 as described above.

According to the embodiment of the present invention, the UE can receive control information from the RS in a subframe n+1 1502. The control information implies a scheduling message for uplink data transmission of the UE in the subframe n+4 1525. A time of receiving the scheduling message by the UE from the RS is not limited to the subframe n+1 1502, which is shown for exemplary purposes only.

The scheduling message received by the UE from the RS in the subframe n+1 1502 is a scheduling message for receiving uplink data by the RS from the UE as described above. That is, the scheduling message received by the RS from the BS in the subframe n+1 1502 is a scheduling message for transmitting uplink data by the UE to the RS in the subframe n+4 1525 delayed by three frames from the subframe n+1 1502.

In response to the scheduling message of the subframe n+1 1502, the RS can receive uplink data from the UE in the subframe n+4 1525.

Figure 17:
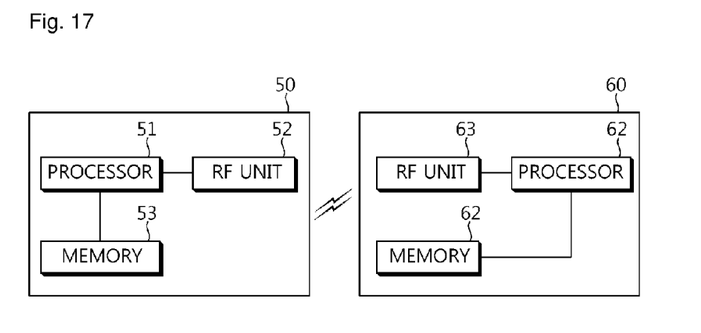
FIG. 17 shows a block diagram of a BS and an RS according to an embodiment of the present invention.

FIG. 17 is a block diagram of a BS and an RS according to an embodiment of the present invention.

Referring to FIG. 17, a BS 50 includes a processor 51, a memory 53, and a radio frequency (RF) unit 52. The processor 51 transmits a scheduling information comprising information regarding a transmission time for transmitting uplink data to the relay station and/or to the user equipment. The scheduling information specifies a subframe in which the relay station transmits the uplink data to the base station. The processor 51 transmits an information comprising a set of hybrid automatic repeat request (HARQ) processes that can be performed between user equipments associated with the relay station or a set of resources that can be allocated to the user equipments associated with the relay station to the relay station. Layers of a radio interface protocol can be implemented by the processor 51. The memory 53 is coupled to the processor 51, and stores a variety of information for operating the processor 51. The RF unit 52 is coupled to the processor 51, and transmits and/or receives a radio signal.

An RS 60 includes a processor 61, a memory 62, and an RF unit 63. The processor 61 receives a scheduling information comprising information regarding a transmission time for transmitting uplink data from the relay station to the base station, and transmits, to the base station, the uplink data at the transmission time determined depending on the scheduling information. The processor 61 may transmits an information on a set of HARQ processes performed between user equipments associated with the relay station or a set of resources allocated to the user equipments associated with the relay station to the BS 50.

The processors 51 and 61 may include an application-specific integrated circuit (ASIC), a separate chipset, a logic circuit, and/or a data processing unit. The memories 52 and 62 may include a read-only memory (ROM), a random access memory (RAM), a flash memory, a memory card, a storage medium, and/or other equivalent storage devices. The RF units 53 and 63 may include a base-band circuit for processing a radio signal. When the embodiment of the present invention is implemented in software, the aforementioned methods can be implemented with a module (i.e., process, function, etc.) for performing the aforementioned functions. The module may be stored in the memories 52 and 62 and may be performed by the processors 51 and 61. The memories 52 and 62 may be located inside or outside the processors 51 and 61, and may be coupled to the processors 51 and 61 by using various well-known means.

All functions described above are not limited to relaying systems but can be applied to systems having femto cells and/or pico cells.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of relaying data in a relay station of a wireless communication system based on a radio frame consisting comprising a plurality of downlink subframes and a plurality of uplink subframes, the method comprising:
   receiving, from a base station, a scheduling message at a downlink subframe; and
   transmitting, to the base station, uplink data at a first uplink subframe or a second uplink subframe according to the scheduling message such that the uplink data is transmitted at the second uplink subframe when the scheduling message comprises a scheduling field that indicates decreasing or increasing a time interval between a time of receiving the scheduling message and a time of transmitting the uplink data, and
   the uplink data is transmitted at the first uplink subframe when the scheduling message does not comprise the scheduling field,
   wherein:
   the first uplink subframe is an uplink subframe shifted by four subframes from the downlink subframe; and
   the second uplink subframe is an uplink subframe shifted by one subframe from the first uplink subframe.

2. The method of claim 1, wherein the scheduling field specifies the second uplink subframe.

3. The method of claim 1, wherein a field value of the scheduling field indicates a transmission time of acknowledgement (ACK)/not-acknowledgement (NACK) of the base station in response to the transmission of the uplink data.

4. The method of claim 1, wherein the scheduling message comprises two scheduling fields, each the two scheduling fields indicating a different uplink subframe.

5. The method of claim 1, wherein the scheduling message is an uplink scheduling message existing in a region for transmitting a physical downlink shared channel (PDSCH).

6. The method of claim 1, further comprising;
   transmitting, to the base station, information on a set of hybrid automatic repeat request (HARQ) processes performed between user equipments associated with the relay station or on a set of resources allocated to the user equipments associated with the relay station.

7. The method of claim 1, further comprising;
   receiving, from the base station, information on a set of hybrid automatic repeat request (HARQ) processes that can be performed between user equipments associated with the relay station or on a set of resources that can be allocated to the user equipments associated with the relay station.

8. A Relay station comprising:
   a radio frequency (RF) unit for transmitting and receiving a radio signal; and
   a processor coupled to the RF unit and configured for:
   receiving, from a base station, a scheduling message at a downlink subframe; and
   transmitting, to the base station, uplink data at a first uplink subframe or a second uplink subframe according to the scheduling message such that the uplink data is transmitted at the second uplink subframe when the scheduling message comprises a scheduling field that indicates decreasing or increasing a time interval between a time of receiving the scheduling message and a time of transmitting the uplink data, and
   the uplink data is transmitted at the first uplink subframe when the scheduling message does not comprise the scheduling field,
   wherein: the first uplink subframe is an uplink subframe shifted by four subframes from the downlink subframe; and
   the second uplink subframe is an uplink subframe shifted by one subframe from the first uplink subframe.

* * * * *